US012771880B2

(12) United States Patent
Pu et al.

(10) Patent No.: US 12,771,880 B2
(45) **Date of Patent: *Oct. 20, 2026**

(54) QUANTIZATION PARAMETER SIGNALING

(71) Applicant: Dolby Laboratories Licensing Corporation, San Francisco, CA (US)

(72) Inventors: Fangjun Pu, Sunnyvale, CA (US); Taoran Lu, Santa Clara, CA (US); Peng Yin, Ithaca, NY (US); Sean Thomas McCarthy, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 74 days.

This patent is subject to a terminal disclaimer.

(21) Appl. No.: 18/936,809

(22) Filed: Nov. 4, 2024

(65) Prior Publication Data

US 2025/0063199 A1 Feb. 20, 2025

Related U.S. Application Data

(63) Continuation of application No. 18/506,828, filed on Nov. 10, 2023, now Pat. No. 12,244,867, which is a (Continued)

(51) Int. Cl.
*H04N 19/70* (2014.01)
*H04N 19/172* (2014.01)

(Continued)

(52) U.S. Cl.
CPC ........... *H04N 19/70* (2014.11); *H04N 19/172* (2014.11); *H04N 19/186* (2014.11); *H04N 19/46* (2014.11)

(58) Field of Classification Search
CPC .... H04N 19/70; H04N 19/172; H04N 19/186; H04N 19/46

(Continued)

(56) References Cited

U.S. PATENT DOCUMENTS 7,373,009 B2 5/2008 Winger
8,737,464 B1 5/2014 Zhang (Continued)

FOREIGN PATENT DOCUMENTS

CN 1973191 B 10/2011
CN 103190147 B 4/2016

(Continued)

OTHER PUBLICATIONS

"H.265: High efficiency video coding". ITU. Jul. 9, 2015. Retrieved Aug. 2, 2015.

(Continued)

*Primary Examiner* — Dominic D Saltarelli

(57) ABSTRACT

A quantization parameter signaling mechanism for both SDR and HDR content in video coding is described using two approaches. The first approach is to send the user-defined $Qp_C$ table directly in high level syntax. This leads to more flexible and efficient QP control for future codec development and video content coding. The second approach is to signal luma and chroma QPs independently. This approach eliminates the need for $Qp_C$ tables and removes the dependency of chroma quantization parameter on luma QP.

7 Claims, 4 Drawing Sheets

Related U.S. Application Data continuation of application No. 17/613,801, filed as application No. PCT/US2020/034758 on May 27, 2020, now Pat. No. 11,856,232.

(60) Provisional application No. 62/853,352, filed on May 28, 2019.

(51) Int. Cl.
*H04N 19/186* (2014.01)
*H04N 19/46* (2014.01)

(58) Field of Classification Search
USPC .................................................... 375/240.26
See application file for complete search history.

(56) References Cited

U.S. PATENT DOCUMENTS

| | | | | |
|---|---|---|---|---|
| 9,253,495 | B2 | 2/2016 | Lu | |
| 9,516,323 | B2 | 12/2016 | Lim | |
| 10,097,832 | B2 | 10/2018 | Sullivan | |
| 10,142,642 | B2 | 11/2018 | Zhang | |
| 10,200,698 | B2 | 2/2019 | Zhang | |
| 10,298,929 | B2 | 5/2019 | Tourapis | |
| 10,419,762 | B2 | 9/2019 | Froehlich | |
| 10,609,371 | B2 * | 3/2020 | Lim | H04N 19/61 |
| 11,240,504 | B2 | 2/2022 | Francois | |
| 2008/0228476 | A1 | 9/2008 | Mehrotra | |
| 2008/0260041 | A1 | 10/2008 | Au | |
| 2009/0175334 | A1 | 7/2009 | Ye | |
| 2009/0296808 | A1 | 12/2009 | Regunathan | |
| 2012/0257870 | A1 | 10/2012 | Deshpande | |
| 2015/0071345 | A1 | 3/2015 | Tourapis | |
| 2015/0195523 | A1 | 7/2015 | Sato | |
| 2015/0373327 | A1 | 12/2015 | Zhang | |
| 2016/0191931 | A1 | 6/2016 | Hannuksela | |
| 2016/0261864 | A1 | 9/2016 | Samuelsson | |
| 2016/0261884 | A1 | 9/2016 | Li | |
| 2016/0373751 | A1 | 12/2016 | Xu | |
| 2017/0272759 | A1 | 9/2017 | Seregin | |
| 2018/0103253 | A1 | 4/2018 | Lu | |
| 2018/0278934 | A1 | 9/2018 | Andersson | |
| 2018/0278958 | A1 | 9/2018 | Hsiang | |
| 2019/0124330 | A1 | 4/2019 | Chien | |
| 2019/0191172 | A1 | 6/2019 | Rusanovskyy | |
| 2019/0327477 | A1 | 10/2019 | Ramasubramonian | |
| 2020/0404275 | A1 | 12/2020 | Hsiang | |

FOREIGN PATENT DOCUMENTS

| | | | |
|---|---|---|---|
| CN | 103460701 | B | 6/2017 |
| CN | 104584559 | B | 4/2018 |
| CN | 104584560 | B | 4/2018 |
| CN | 104023236 | B | 7/2019 |
| CN | 107211121 | B | 10/2020 |
| CN | 109196863 | B | 7/2021 |
| EP | 0674442 | B1 | 2/2001 |
| EP | 2854404 | B1 | 11/2024 |
| GB | 2506852 | A | 4/2014 |
| RU | 2674307 | C1 | 12/2018 |
| RU | 2678483 | C1 | 1/2019 |
| RU | 2017134677 | A | 4/2019 |
| WO | 2014008277 | A1 | 1/2014 |
| WO | 2014161741 | W | 10/2014 |
| WO | 2015035092 | A2 | 3/2015 |
| WO | 2016056977 | A1 | 4/2016 |
| WO | 2018016381 | A1 | 1/2018 |
| WO | 2018175638 | A1 | 9/2018 |
| WO | 20180175638 | W | 9/2018 |
| WO | 2018237146 | A1 | 12/2018 |
| WO | 2020216376 | A1 | 10/2020 |
| WO | 20200216376 | W | 10/2020 |

OTHER PUBLICATIONS

Ramasubramonian et al., "AHG15: On signalling of chroma QP tables," Joint Video Experts Team (JVET) of ITU-T SG 16 WP 3 and ISO/IEC JTC 1/SC 29/WG 11, 15th Meeting: Gothenburg, SE, Jul. 3-12, 2019, pp. 1-4, Document: JVET-O0650-v1.

Andersson et al, "Report for CE1.a (Chroma QP)", Doc. m37179, ISO/IEC JTC1/SC29/WG11 MPEG2015/m37179 Oct. 2015, Geneva, Switzerland, pp. 1-6.

Baylon et al "Response to Call for Evidence for HDR and WCG Video Coding: ARRIS, Dolby and InterDigital", Doc. m36264, ISO/IEC JTC1/SC29/WG11 MPEG2015/M36264, Jun. 2015, Warsaw, Poland, pp. 1-9.

Bross, B. "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1001-v3, pp. 1-355.

Pu et al., "AHG15: chroma quantization parameters QpC table," Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0433, pp. 1-6.

Ikonin et al., "AHG15: Signalling of chroma Qp mapping table," Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0186-v2, pp. 1-12.

Lu et al "Chroma Quantization Parameter Qpc Table for HDR Signal", Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0221, pp. 1-6.

Ouedraogo et al., "AHG17/AHG12] Bitstream merging with variable initial Qp," Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0192, pp. 1-4.

Paluri et al. "AHG15: Chroma Quantization QpC Parameter Signalling," Joint Video Experts Team (JVET)of ITU-T SG 16 WP 3 and ISO/IEC JTC 1/SC 29/WG 11, 15th Meeting: Gothenburg, SE, Jul. 3-12, 2019, Document: JVET-O0298-r1, pp. 1-9.

Segall, A. et al "JVET common test conditions and evaluation procedures for HDR/WCG video", Joint Video Exploration Team (JVET) of ITU-T SG 16 WP 3 and ISO/IEC JTC 1/SC 29/WG 11, 12th Meeting: Macao, CN, Oct. 3-12, 2018, Document: JVET-L1011, pp. 1-10.

Sullivan, G. et al "Meeting Report of the 14th Meeting of the. Joint Video Experts Team (JVET), Geneva, CH, Mar. 19-27, 2019," Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N_Notes_dC, pp. 1-411.

Ramasubramonian A.K. et al, Additional information on HDR video coding technology proposal by Qualcomm and Technicolor, Joint Video Experts Team (JVET) of ITU-T SG 16 WP 3 and ISO/IEC JTC 1/SC 29/WG 11, JVET-J0067, 10th Meeting: San Diego, Apr. 10-20, 2018.

Russian PCT Application No. PCT/RU2019/000444 filed on Jun. 21, 2019.

U.S. Appl. No. 62/839,607, filed Apr. 26, 2019.

U.S. Appl. No. 62/871,197 filed Jul. 7, 2019.

U.S. Appl. No. 62/872,238, filed Jul. 9, 2019.

* cited by examiner

100

| | | | | | | | | | | | | | | | | |
|---|---|---|---|---|---|---|---|---|---|---|---|---|---|---|---|---|
| qPi | <30 | 30 | 31 | 32 | 33 | 34 | 35 | 36 | 37 | 38 | 39 | 40 | 41 | 42 | 43 | >43 |
| Qpc | =qPi | 29 | 30 | 31 | 32 | 33 | 33 | 34 | 34 | 35 | 35 | 36 | 36 | 37 | 37 | =qPi-6 |

FIG. 1

200

| | | | | | | | | | | | | | | | | | | | |
|---|---|---|---|---|---|---|---|---|---|---|---|---|---|---|---|---|---|---|---|
| qPi | <21 | 21 | 22 | 23 | 24 | 25 | 26 | 27 | 28 | 29 | 30 | 31 | 32 | 33 | 34 | 35 | 36 | 37 | 38 |
| Qpc | =qPi | 20 | 21 | 21 | 22 | 22 | 22 | 23 | 23 | 23 | 24 | 24 | 24 | 25 | 25 | 25 | 26 | 26 | 27 |

| | | | | | | | | | | | | | | | | | |
|---|---|---|---|---|---|---|---|---|---|---|---|---|---|---|---|---|---|
| qPi | 39 | 40 | 41 | 42 | 43 | 44 | 45 | 46 | 47 | 48 | 49 | 50 | 51 | 52 | 53 | 54 | >54 |
| Qpc | 27 | 28 | 29 | 29 | 30 | 31 | 32 | 33 | 33 | 34 | 34 | 35 | 35 | 36 | 36 | 37 | =qPi-18 |

FIG. 2

300

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| Qpc | 1 | 0 | 1 | 1 | 1 | 1 | 0 | 1 | 0 | 1 | 0 | 1 | 0 | 1 | 0 | 1 |

FIG. 3

400A

| qPi | <21 | 21 | 22 | 23 | 24 | 25 | 26 | 27 | 28 | 29 | 30 | 31 | 32 | 33 | 34 | 35 | 36 | 37 | 38 |
|---|---|---|---|---|---|---|---|---|---|---|---|---|---|---|---|---|---|---|---|
| Qpc | =qPi | 20 | 21 | 21 | 22 | 22 | 22 | 23 | 23 | 23 | 24 | 24 | 24 | 25 | 25 | 25 | 26 | 26 | 27 |

| qPi | 39 | 40 | 41 | 42 | 43 | 44 | 45 | 46 | 47 | 48 | 49 | 50 | 51 | 52 | 53 | 54 | >54 |
|---|---|---|---|---|---|---|---|---|---|---|---|---|---|---|---|---|---|
| Qpc | 27 | 28 | 29 | 29 | 30 | 31 | 32 | 33 | 33 | 34 | 34 | 35 | 35 | 36 | 36 | 37 | =qPi-18 |

FIG. 4A

400B

| qPi | <30 | 30 | 31 | 32 | 33 | 34 | 35 | 36 | 37 | 38 | 39 | 40 | 41 | 42 | 43 | 44 | 45 |
|---|---|---|---|---|---|---|---|---|---|---|---|---|---|---|---|---|---|
| Qpc | =qPi | 29 | 30 | 31 | 32 | 33 | 33 | 34 | 34 | 34 | 35 | 35 | 36 | 36 | 36 | 37 | 37 |

| qPi | 46 | 47 | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|---|---|
| Qpc | 38 | 39 | 39 | 40 | 41 | 42 | 43 | 43 | 44 | 45 | 46 | 47 | 47 | 48 | 49 | 50 | 51 | 51 |

FIG. 4B

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| SDR QPc | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 29 | 30 |
| Lin-MAP | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 29 | 30 |

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 |
| SDR QPc | 31 | 32 | 33 | 33 | 34 | 34 | 35 | 35 | 36 | 36 | 37 | 37 | 38 | 39 | 40 | 41 | 42 | 43 | 44 | 45 | 46 | 47 | 48 | 49 | 50 | 51 | 52 | 53 | 54 | 55 | 56 | 57 |
| Lin-MAP | 30 | 31 | 31 | 32 | 33 | 33 | 34 | 35 | 35 | 36 | 36 | 37 | 38 | 39 | 40 | 41 | 42 | 43 | 44 | 45 | 46 | 47 | 48 | 49 | 50 | 51 | 52 | 53 | 54 | 55 | 56 | 57 |

FROM FIG. 5A

QUANTIZATION PARAMETER SIGNALING

CROSS-REFERENCE TO RELATED APPLICATIONS

This application is a continuation of U.S. patent application Ser. No. 18/506,828, filed on Nov. 10, 2023, which is a continuation of U.S. patent application Ser. No. 17/613,801, filed on Nov. 23, 2021, which is the U.S. National stage of PCT Application No. PCT/US2020/034758, filed May 27, 2020, which claims priority to the U.S. Provisional Application No. 62/853,352, filed on May 28, 2019, each of which is incorporated by reference in its entirety herein.

TECHNICAL FIELD

The present disclosure is related to deriving and signaling quantization parameters when encoding video signals, and more particularly to methods, apparatus, computer program and computer program-based device for deriving and signaling of luma and/or chroma quantization parameters of the video signal.

BACKGROUND

The quantization parameter (QP) is one type of parameter used in the video bitstream to adjust quality and bitrate. In general, a lower QP value, set during encoding, results in a higher quality of the encoded video at the expense of a required higher number of consumed bits, with a QP of 0 meaning no quantization. On the other hand, for a higher value of QP, the quality of the encoded video is lower and fewer bits are consumed. Additionally, a decoder uses QP values when reconstructing video content from the encoded video.

Versatile Video Coding (VVC) is a standard being developed by the Joint Video Exploration Team (JVET) that will code both Standard Dynamic Range (SDR) and High Dynamic Range (HDR) content. In the current (2019) VVC specification, signaling of quantization parameters for luma and chroma components are treated in different ways.

For the luma component, a delta Quantization Parameter (QP), meaning the difference between consecutive quantization parameter values, is signaled and added to the initial QP values for each slice.

For chroma, the chroma quantization parameter (Qpc) is derived from the luma QP with chroma offset value (qPi) using a chroma quantization parameter table. By way of example, FIG. 1 shows a table (100) containing different values of Qpc as a function of the luma quantization parameter with chroma offset, qPi. The data shown in table (100) correspond to a certain chroma format. According to the VVC standard, the chroma format is based on the variable chroma_format_idc ranging from 0 to 3. Table (100) corresponds to a chroma_format_idc value of 1, representing the chroma format (4:2:0).

Table (100) of FIG. 1 is inherited from the High Efficiency Video Coding (HEVC) standard and designed only for SDR content. However, when HDR Perceptual Quantization (PQ) content was first studied in JCT-VC, it was concluded that the default SDR Qpc table is not suitable for HDR content because it results in chroma artifacts at low bitrate, especially in achromatic regions. Consequently, non-normative encoder optimization using a variable called ChromaQPOffset was introduced in the HDR Common Test Conditions (CTC) for HDR PQ content. Indicating in general a difference from a luma QP value, ChromaQPOffset is signaled in the picture parameter set (PPS), which means that a constant value is used based on the input QP. However, there are cases in which QP varies over a picture and this cannot be handled by a constant offset.

In the first version of HEVC, there were distinct QP offsets for each of the two chroma components at the slice level. However, at the Coding unit (CU) level, delta QP was applied to all three components with chroma also going through a mapping table based on luma QP. In the Range Extensions (Rext) version, separate chroma QP control was introduced at the CU level through chroma QP offset lists specified for Cb and Cr, respectively.

Quantization Parameter Derivation in the Current VVC Standard

In this process, the luma quantization parameter $Qp'_Y$ and the chroma quantization parameters $Qp'_{Cb}$ and $Qp'_{Cr}$ are derived. The initial value of the luma quantization parameter $Qp_Y$ for the slice is derived as:

$$\text{Slice}Qp_Y = 26 + \text{init\_qp\_minus26} + \text{slice\_qp\_delta}$$

$qP_{Y\_PREV}$ represents the previous luma quantization parameter for current coding unit. $qP_{Y\_PREV}$ is set equal to $\text{SliceQp}_Y$ if the current quantization group is the first quantization group in a slice or brick. Otherwise, $qP_{Y\_PREV}$ is set equal to the luma quantization parameter $Qp_Y$ of the last luma coding unit in the previous quantization group in decoding order.

$qP_{Y\_PRED}$ represents the predicted luma quantization parameter for current coding unit. If the current quantization group is the first quantization group in a CTB row within a brick and the top coding unit is available, set $qP_{Y\_PRED}$ to be $Qp_Y$ of the top CU, otherwise, $$qP_{Y\_PRED} = (qP_{Y\_A} + qP_{Y\_B} + 1) \gg 1$$

where $qP_{Y\_A}$ is set to be $qP_{Y\_PREV}$ if the left coding block is not the first coding block in the left quantization group or if the left coding block is not available; $qP_{Y\_B}$ is set to be $qP_{Y\_PREV}$ if the top coding block is not the first coding block in the top quantization group or if the top coding block is not available.

The variable $Qp_Y$ for each coding unit is derived as follows:

$$Qp_Y = ((qP_{Y\_PRED} + CuQp\text{Delta}Val + 64 + 2 * QpBd\text{Offset}_Y)\% (64 + QpBd\text{Offset}_Y)) - QpBd\text{Offset}_Y$$

CuQpDeltaVal is specified with cu_qp_delta_abs and cu_qp_delta_sign_flag at the transform unit layer.

The luma quantization parameter $Qp'_Y$ is derived as follows:

$$Qp'_Y = Qp_Y + QpBd\text{Offset}_Y$$

When ChromaArrayType is not equal to 0 and treeType is SINGLE_TREE or DUAL_TREE_CHROMA, the following applies:

When treeType is equal to DUAL_TREE_CHROMA, the variable $Qp_Y$ is set equal to the luma quantization parameter $Qp_Y$ of the current luma coding unit that covers the luma location (xCb+cbWidth/2, yCb+cbHeight/2).

The variables $qP_{Cb}$ and $qP_{Cr}$ are derived as follows:

$$qPi_{Cb} = \text{Clip3}(-QpBd\text{Offset}_C, 69, Qp_Y + \text{pps\_cb\_qp\_offset} + \text{slice\_cb\_qp\_offset})$$

$$qPi_{Cr} = \text{Clip3}(-QpBd\text{Offset}_C, 69, Qp_Y + \text{pps\_cr\_qp\_offset} + \text{slice\_cr\_qp\_offset})$$

If ChromaArrayType is equal to 1, the variables $qP_{Cb}$ and $qP_{Cr}$ are set equal to the value of $Qp_C$ as specified in Table 1 (shown again below for convenience) based on the index qPi equal to $qPi_{Cb}$ and $qPi_{Cr}$, respectively.

Otherwise, the variables $qP_{Cb}$ and $qP_{Cr}$ are set equal to Min(qPi, 63), based on the index qPi equal to $qPi_{Cb}$ and $qPi_{Cr}$, respectively.

The chroma quantization parameters for the Cb and Cr, $Qp'_{Cb}$ and $Qp'_{Cr}$, are derived as follows:

$$Qp'_{Cb} = qP_{Cb} + QpBd\text{Offset}_C$$

$$Qp'_{Cr} = qP_{Cr} + QpBd\text{Offset}_C$$

SUMMARY

Current video content is not the same as the SDR content for which the original default SDR Qpc table was designed. As one example, luma and chroma components for SDR and HDR content may be coded using Y'CbCr or ICtCp signal formats. For HDR content, the situation is more complex. HDR content may additionally be coded using HLG or PQ transfer characteristics. It may be beneficial to signal different chroma quantization parameters for different chroma component types and transfer characteristics. It may also be beneficial to signal different chroma quantization parameters for the two different chroma components, Cb and Cr or Ct and Cp. It may also be beneficial to signal chroma quantization parameters in a content-dependent manner. The disclosed methods and devices address the above-mentioned issues and requirements.

Devices and methods according to the present disclosure provide solutions to the problem of deriving chroma QP (QPc) for HDR content. Additionally, devices and methods for signaling such derived chroma QP for HDR are being also disclosed. According to a first aspect of the present disclosure, a method to decode a coded video bitstream is disclosed, comprising: a) extracting a chroma quantization parameter (Qpc) table mapping luma quantization parameter (Qp) with chroma QP offset values qP(i), to corresponding chroma Qp values Qpc(i), wherein: i) 'i' is an index of table entries ranging from startID to endID; ii) startID is an integer greater or equal to 1 and less than N, N being a total number of the Qpc table entries; and iii) endID is an integer greater than startID and 1, and less than or equal to N; and b) generating a decoded output signal based on the extracted Qpc table and the coded video bitstream; wherein, the coded bit stream comprises a table identifier, and wherein: in a first case: the table identifier indicates a presence of a default table; and in a second case: the coded video bitstream further comprises one or more elements signaled in high-level syntax, the one or more elements being coded based on a combination of one of a) two or more chroma Qp values, or b) one or more chroma Qp values with one or more luma Qp with chroma offset values.

According to a second aspect of the present disclosure, a method to decode a coded stream of a video signal is disclosed, comprising: extracting from the coded stream, luma quantization parameters (Qps), first chroma component Qps, and second chroma component Qps; and generating the output decoded video signal based on the extracted luma, first and second chroma component Qps and the coded video bitstream; wherein: the coded video stream comprises a plurality of elements signaled in a high-level syntax; the plurality of elements is coded based on a combination of the luma Qps, the first and the second chroma component Qps; the first chroma component Qps are derived based on prediction values of the first chroma component Qps and a bit-depth of a first chroma component samples of the video signal; and the second chroma component Qps are derived based on prediction values of the second chroma component Qps and a bit-depth of a second chroma component samples of the video signal.

DESCRIPTION OF THE DRAWINGS

FIG. 1 shows an example of a table containing different values of chroma quantization parameters as a function of the luma quantization parameter.

FIG. 2 shows an exemplary HDR Qpc table in accordance with an embodiment of the present disclosure.

FIG. 3 shows an exemplary Qpc table in accordance with an embodiment of the present disclosure.

FIG. 4A shows an exemplary Qpc table for HDR PQ content type.

FIG. 4B shows an exemplary Qpc table for HDR Hybrid-Long Gamma (HLG) content type.

DETAILED DESCRIPTION

Definitions

Figure 5A:
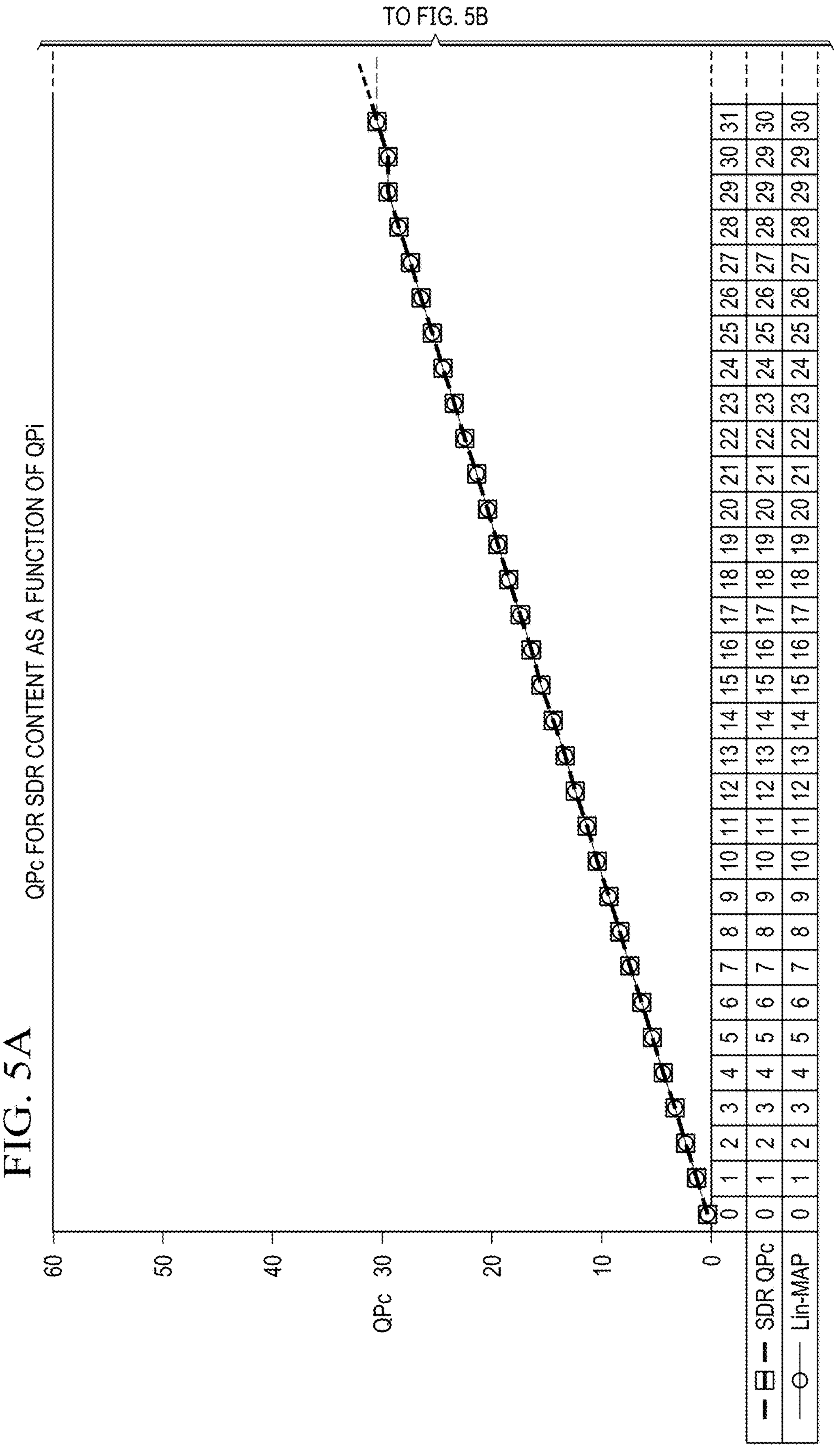
FIGS. 5A and 5B show an exemplary SDR Qpc mapping function based on luma quantization parameters.

Throughout this document, the technical terms used related to video encoding and decoding are defined in accordance with Versatile Vide Coding (Draft 5), document JVET-N1001-v3, Joint Video Experts Team (JVET) of ITU-T SG 16 WP 3 and ISO/IEC JTC 1/SC 29/WG 11, 14th Meeting: Geneva, CH, 19-27 Mar. 2019

Description

1. Deriving Chroma PQ Based on User-Defined Qpc Tables

In accordance with embodiments of the present disclosure, chroma QP for HDR content may be determined using a user-defined Qpc table. FIG. 2 shows Table (200) representing an exemplary HDR Qpc table in accordance with an embodiment of the present disclosure. Table (200) serves essentially the same purpose for HDR content that the default SDR Qpc table specified in current VVC serves for SDR content. The person skilled in the art will appreciate that the disclosed approach based on a user-defined Qpc table for HDR content would unify codec design for all SDR and HDR signal types and leads to more flexible and efficient QP control for future codec development.

According to an embodiment of the present disclosure, the HDR Qpc table as described may be signaled directly in high level syntax such as the video parameter set (VPS), signal parameter set (SPS), PPS, adaptation parameter set (APS), slice header, and SEI message, etc. In order to reduce signaling overhead, and according to other embodiments of the present disclosure, default Qpc tables may be used as normative tables in the standard specification or as non-normative examples in the standard specification.

With reference to FIG. 2, and in SPS, a new syntax element chroma_qp_table_idc may be added. A value of chroma_qp_table_idc equal to 0 refers to the original SDR Qpc table in the VVC specification text, see table (100) in FIG. 1. When the value of chroma_qp_table_idc is equal to 1, it refers to the table (200) of FIG. 2. In accordance with an embodiment of the present disclosure, the variable chroma_qp_table_idc is an indication of an index to the array of Qpc as a function of qPi for ChromaArrayType equal to 1. The value of chroma_qp_table_idc may be in the range of 0 to 1, inclusive.

In accordance with further embodiments of the present disclosure, either one Qpc table can be signaled and shared by both Cb and Cr, or two separate tables designed for Cb and Cr, respectively, can be signaled. To reduce the signaling overhead, each Qpc table can be differentially coded, approximated with piece-wise linear function, run-length coded, coded with Lempel-Ziv-Welch (LZW) or similar algorithms, or coded with a mixture of the above-mentioned techniques.

The Qpc table described above may be used for HDR content using HLG or PQ transfer characteristic. Referring back to FIGS. 1-2, it is observed from Tables (100, 200), and Qpc tables designed for other content types such as HLG, that some Qpc values are either equal to qPi, or can be derived directly by subtracting a constant value. In order to save coding bits, the range of table elements which need to be signaled in the bitstream can be specified with starting and ending indexes [startID, endID].

In what follows, various methods according to the teachings of the disclosure and for signaling chroma QP values will be described. Throughout the present disclosure, the term "delta Qp, also represented as "dQp", will be used to describe the difference between two consecutive QP values.

Method 1a

In this method, the difference between two adjacent Qpc entries within [startID, endID] is coded:

$$dQp_C[i] = Qp_C[i] - Qp_C[i-1] \tag{1}$$

In general, SDR and HDR Qpc tables according to the teachings of the present disclosure may only include dQp values of 0 and 1. It is possible to signal the delta QP values directly.

Alternatively, codewords can be composed of multiple delta QP values. For example, delta QP values of Cb and Cr pairs having the same index value may be combined. As another example, delta QP values of two sequential index values can be combined for Cb and similarly for Cr. Optionally, sequences of codewords constructed from combinations of delta QP values can further be compressed using methods such as Huffman coding or other lossless compression algorithms. For delta QPc values other than 0 and 1, a maximum delta value may be specified in syntax. In some cases, startID and endID may be constrained to be even or odd values to reduce the number of bits that would need to be signaled.

The following descriptions of further embodiments will focus on the differences between it and the previously described embodiment. Therefore, features which are common to both embodiments will be omitted from the following description, and so it should be assumed that features of the previously described embodiment are or at least can be implemented in the further embodiment, unless the following description thereof requires otherwise.

Method 1b

In this method, the difference value between each pair of {qPi, Qpc} within [startID, endID] may be coded:

$$dQp[i] = qPi[i] - Qp_C[i] \tag{2}$$

The delta QP values between qPi and Qpc may be within a range from 0 to 18. This indicates that method 1a may be more coding friendly than method 1b.

Method 1c

This method is based on fitting the Qpc mapping curve from qPi through a piecewise-linear function defined as:

$$Qpc[i] = \begin{cases} qPi & i < \text{startID} \\ \text{round}(\alpha * qPi + \beta) & i \in [\text{startID, endID}] \\ qPi - \text{offset} & i > \text{endID} \end{cases}$$

where $$\alpha = \frac{Qpc[\text{endID}] - Qpc[\text{startID}]}{qPi[\text{endID}] - qPi[\text{startID}]},$$

$$\beta = \frac{Qpc[\text{startID}] * qPi[\text{endID}] - Qpc[\text{endID}] * qPi[\text{startID}]}{qPi[\text{endID}] - qPi[\text{startID}]}$$

Method 1d

In this method, run-length coding may be used to code the $dQp_C[i]$ values defined in formula (1). Referring to Table (100) of FIG. 1, as an example, the delta Qp values are derived as a series of 0 and 1. Delta values (0 or 1) along with the count of consequent values may be coded. FIG. 3 shows a table (300) which is an exemplary illustration of a Qpc table based on this method.

Figure 5B:
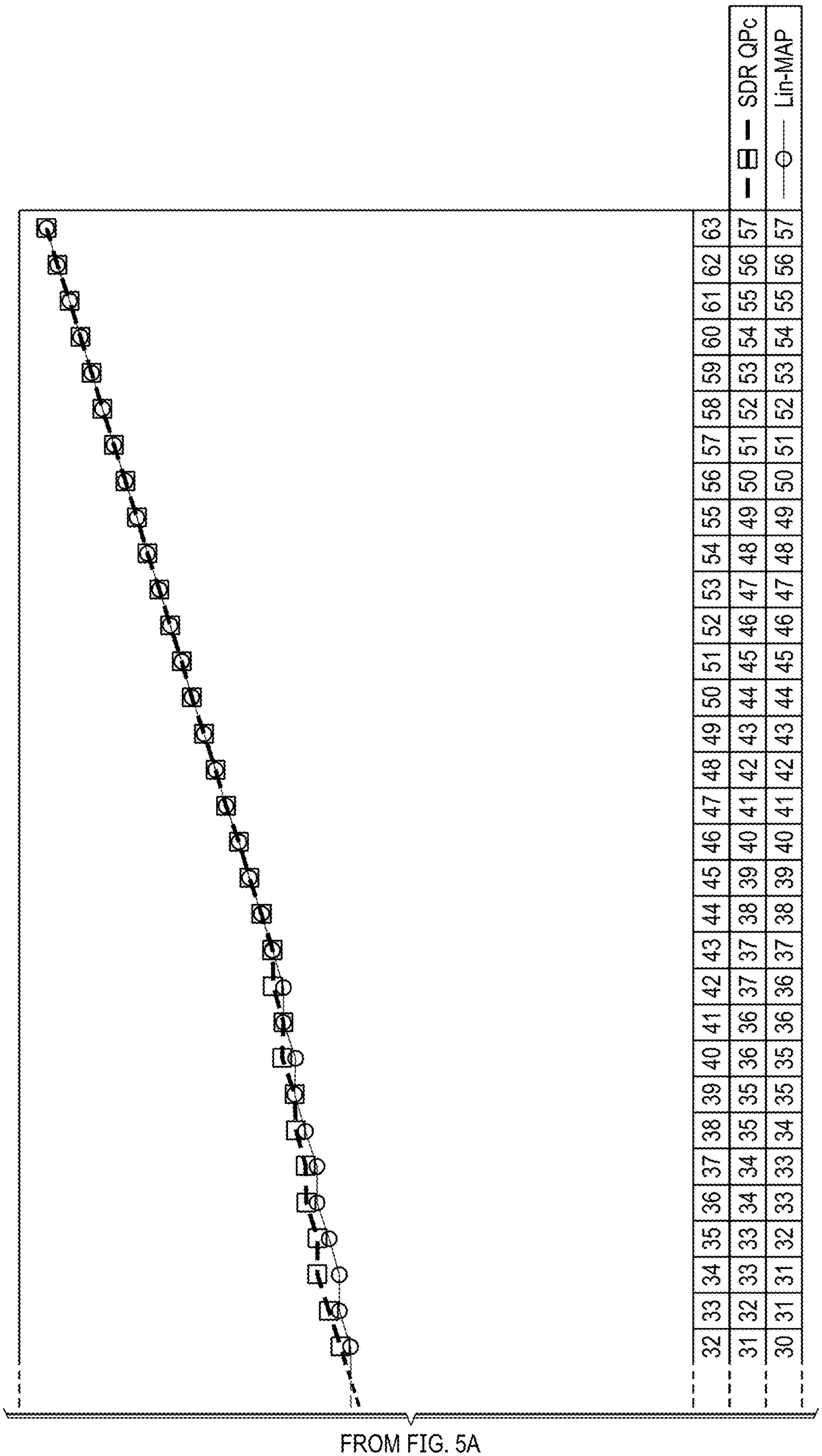

In accordance with an embodiment of the present disclosure, one default $Qp_C$ table may be pre-defined for each of different signal types such as SDR, PQ and HLG content. FIGS. 4A-4B shows tables (400A, 400B) representing exemplary Qpc tables for HDR PQ and HLG content respectively. FIGS. 5A-5B depict examples of qPi to Qpc mappings for SDR content. If the user-defined $Qp_C$ table is not present, the encoder and decoder may apply the default $Qp_C$ table instead. Embodiments according to the present disclosure may be envisaged wherein user-defined $Qp_C$ are not signaled. This approach has the benefit of saving more bits.

The following table corresponds to method 1a above, showing an exemplary syntax of raw byte sequence payload (RBSB) for an SPS and Tile Group header, where the syntax elements in accordance with the teachings of the present disclosure are depicted in an italic font in contrast with other existing syntax elements. This is followed by detailed description of various syntax elements. A default QPc table may be specified in SPS by signaling a default Qpc table type index. If the default table is not provided, the pre-defined Qpc table may be sent in SPS with delta QP values between two adjacent table elements. One or more alternative QPc tables for use in a slice may be signaled in PPS to override the SPS Qpc table.

| | Descriptor |
|---|---|
| seq_parameter_set_rbsp( ) { | |
| sps_decoding_parameter_set_id | u(4) |
| ...... | |
| *sps_default_qpc_table_flag* | *u(1)* |
| *if( sps_default_qpc_table_flag ) {* | |
| *default_qpc_table_type_idx* | *u(2)* |
| } | |
| *else* { | |
| *sps_separate_qpc_table_enable_flag* | *u(1)* |
| *sps_qpc_table_start_index_div2* | *u(5)* |
| *sps_qpc_table_end_index_div2* | *u(5)* |
| *for( i = sps_qpc_table_start_index_div2*2; i <= sps_qpc_table_end_index_div2*2; i++ ) {* | |
| *sps_cb_qp_delta[i]* | *u(1)* |
| } | |
| *if( sps_separate_qpc_table_enable_flag ) {* | |
| *for( i = sps_qpc_table_start_index_div2*2; i <= sps_qpc_table_end_index_div2*2; i++ ) {* | |
| *sps_cr_qp_delta[i]* | *u(1)* |
| } | |
| } | |
| } | |
| ...... | |
| } | |
| pic_parameter_set_rbsp( ) { | |
| pps_pic_parameter_set_id | ue(v) |
| pps_seq_parameter_set_id | ue(v) |
| ...... | |
| init_qp_minus26 | se(v) |
| cu_qp_delta_enabled_flag | u(1) |
| if( cu_qp_delta_enabled_flag ) | |
| cu_qp_delta_subdiv | ue(v) |
| pps_cb_qp_offset | se(v) |
| pps_cr_qp_offset | se(v) |
| *pps_slice_chroma_qp_offsets_present_flag* | u(1) |
| *if(!sps_default_qpc_table_flag ) {* | |
| *pps_slice_qpc_table_present_flag* | *u(1)* |
| } | |
| ...... | |
| } | |
| slice_header( ) { | |
| slice_pic_parameter_set_id | ue(v) |
| ...... | |
| slice_qp_delta | se(v) |
| if( pps_slice_chroma_qp_offsets_present_flag ) { | |
| slice_cb_qp_offset | se(v) |
| slice_cr_qp_offset | se(v) |
| } | |
| *if( pps_slice_qpc_table_present_flag ) {* | |
| *for( i = sps_qpc_table_start_index_div2*2; i <= sps_qpc_table_end_index_div2*2; i++ ) {* | |
| *slice_cb_qp_delta[i]* | *u(1)* |
| } | |
| *if( sps_separate_qpc_table_enable_flag ) {* | |
| *for( i = sps_qpc_table_start_index_div2*2; i <= sps_qpc_table_end_index_div2*2; i++ ) {* | |
| *slice_cr_qp_delta[i]* | *u(1)* |
| } | |
| } | |
| } | |
| ...... | |
| } | |

sps_default_qpc_table_flag equal to 1 specifies that a default chroma quantization parameter table shall be used and thus there is no need to send the $Qp_C$ table. Instead, an index is signaled to indicate which default $Qp_C$ table is to be used. sps_default_qpc_table_flag equal to 0 specifies that default $Qp_C$ tables have not been defined and need to be sent in SPS.

default_qpc_table_type_idx indicates which default $Qp_C$ table to use when sps_default_qpc_table_flag equal to 1. default_qpc_table_type_idx equal to 0 and pps_slice_qpc_table_present_flag equal to 0 indicates that one or more default SDR $Qp_C$ tables shall be used. default_qpc_table_type_idx equal to 1 and pps_slice_qpc_table_present_flag equal to 0 indicates that one or more HDR PQ $Qp_C$ tables shall be used. default_qpc_table_type_idx equal to 2 and pps_slice_qpc_table_present_flag equal to 0 indicates that one or more default HLG $Qp_C$ tables shall be used. default_qpc_table_type_idx equal to 3 is reserved for future use.

sps_separate_qpc_table_enable_flag equal to 1 specifies that Cb and Cr use separate $Qp_C$ tables. sps_cr_qp_delta[i] and sps_cr_qp_gap_idx are defined and signaled in SPS, slice_cr_qp_delta[i] and slice_cr_qp_gap_idx are defined in slice header. sps_separate_qpc_table_enable_flag equal to 0 specifies that Cb and Cr use the same $Qp_C$ table.

sps_qpc_table_start_index_div2 specifies the starting index from which the $Qp_C$ table elements should be signaled with the delta QP values. It is defined as an even number between 0 to 63. For table elements with index less than sps_qpc_table_start_index_div2*2, $Qp_C$ is set to be same as qPi.

sps_qpc_table_end_index_div2 specifies the ending index before which the $Qp_C$ table elements should be signaled with the delta QP values. It is defined as an even number between 0 to 63. For table elements with index greater than sps_qpc_table_end_index_div2*2, sps_cb_qp_delta[i] and sps_cr_qp_delta[i] are set to 1.

sps_cb_qp_delta[i] specifies the delta values between spsQpcb[i] and spsQpcb[i−1], with sps_cb_qp_delta[0], to construct the quantization parameter table for Cb defined in SPS. The ith entry of the Cb quantization parameter table in SPS is derived as: spsQpcb[i]=sps_cb_qp_delta[i]+spsQpcb[i−1].

sps_cr_qp_delta[i] specifies the delta values between spsQpcr[i] and spsQpcr[i−1], with sps_cr_qp_delta[0], to construct the quantization parameter table for Cr defined in SPS. The ith entry of the Cr quantization parameter table in SPS is derived as: spsQpcr[i]=sps_cr_qp_delta[i]+spsQpcr[i−1].

pps_slice_qpc_table_present_flag equal to 1 specifies that quantization parameter tables for Cb and Cr components for the current slice are present and defined in slice header. pps_slice_qpc_table_present_flag equal to 0 specifies that quantization parameter tables for Cb and Cr components for the current slice are not present in slice header and default quantization parameter tables are applied for Cb and Cr.

slice_cb_qp_delta[i] specifies the delta values between sliceQpcb[i] and sliceQpcb[i−1], with slice_cb_qp_delta[0], to construct the slice quantization parameter table for Cb. The ith entry of the slice $Qp_C$ table for Cb component is derived as: sliceQpcb[i]=slice_cb_qp_delta[i]+sliceQpcb[i−1].

slice_cr_qp_delta[i] is defined when sps_separate_qpc_table_enable_flag equal to 1 specifing the delta values between sliceQpcr[i] and sliceQpcr[i−1], with slice_cr_qp_delta[0], to construct the slice quantization parameter table for Cr. The ith entry of the slice $Qp_C$ table for Cr component is derived as: sliceQpcr[i]=slice_cr_qp_delta[i]+sliceQpcr[i−1].

2. Deriving the Chroma QP Independently from the Luma QP

According to further embodiments of the present disclosure, luma and chroma Qps may be signaled independently.

Such an approach has the benefit of eliminating the dependency of the chroma QP on the luma QP. In what follows, derivation of the chroma QP in accordance with embodiments of the present disclosure is described in detail.

The initial values of the chroma quantization parameter for the slice, SliceQpCb and SliceQpCr, may be derived as follows:

$$\text{Slice}QpCb = 26 + \text{init\_qp\_minus26} + \text{slice\_cb\_qp\_delta} \quad (3)$$

$$\text{Slice}QpCr = 26 + \text{init\_qp\_minus26} + \text{slice\_cr\_qp\_delta} \quad (4)$$

$qP_{Cb\_PREV}$ and $qP_{Cr\_PREV}$ are set equal to $\text{SliceQp}_{Cb}$ and $\text{SliceQp}_{Cr}$ respectively if the current quantization group is the first quantization group in a slice or brick. Otherwise, $qP_{Cb\_PREV}$ and $qP_{Cr\_PREV}$ are set equal to the chroma quantization parameter $Qp_C$ of the last chroma coding unit in the previous quantization group in decoding order.

$qP_{Cb\_PRED}$ and $qP_{Cr\_PRED}$ are the predicted chroma quantization parameters for current coding unit. If the current quantization group is the first quantization group in a CTB row within a brick and the top coding unit is available, set $qP_{Cb\_PRED}$ and $qP_{Cr\_PRED}$ to be $Qp_C$ of the top CU, otherwise, $$qP_{Cb\_PRED} = (qP_{Cb\_A} + qP_{Cb\_B} + 1) >> 1 \quad (5)$$

$$qP_{Cr\_PRED} = (qP_{Cr\_A} + qP_{Cr\_B} + 1) >> 1 \quad (6)$$

where $qP_{Cb\_A}$ and $qP_{Cr\_A}$ are set to be $qP_{Cb\_PREV}$ and $qP_{Cr\_PREV}$ respectively if the left coding block is not the first coding block in the left quantization group or if the left coding block is not available; $qP_{Cb\_B}$ and $qP_{Cr\_B}$ are set to be $qP_{Cb\_PREV}$ and $qP_{Cr\_PREV}$ respectively if the top coding block is not the first coding block in the top quantization group or if the top coding block is not available.

The variable QpCb and QpCr for each coding unit may be derived as follows:

$$QpCb = ((\text{qPCb\_PRED} + CuCbQp\text{Delta}Val + 64 + 2 * QpBd\text{Offset}C)\% (64 + QpBd\text{OffsetC})) - QpBd\text{Offset}C \quad (7)$$

$$QpCr = ((\text{qPCr\_PRED} + CuCrQp\text{Delta}Val + 64 + 2 * QpBd\text{Offset}C)\% (64 + QpBd\text{OffsetC})) - QpBd\text{Offset}C \quad (8)$$

The chroma quantization parameter $Qp'_{Cb}$ and $Qp'_{Cr}$ are then derived as follows:

$$Qp'_{Cb} = Qp_{Cb} - QpBd\text{Offset}_C \quad (9)$$

$$Qp'_{Cr} = Qp_{Cr} - QpBd\text{Offset}_C \quad (10)$$

The difference values between the quantization parameter of the current coding unit and its prediction, CuCbQpDeltaVal and CuCrQpDeltaVal, may be specified at the transform unit layer. There are several ways to code the delta QP values:

In what follows, exemplary methods in accordance with the teaching of the present disclosure will be described. Also, the difference between the QP of each color component (e.g., luma, chroma Cb, and chromo Cr) and a predicted value of the same is abbreviated as dPQ' to distinguish from dPQ which indicates, as described previously, the difference of consecutive QPs in the context of Qpc tables.

Method 2a

In this method, the dQP's of the three color components, luma, chroma Cb and chroma Cr, as represented by the variables CuQpDeltaVal, CuCbQpDeltaVal and CuCrQpDeltaVal respectively, are coded.

The following descriptions of further embodiments will focus on the differences between it and the previously described embodiment. Therefore, features which are common to both embodiments will be omitted from the following description, and so it should be assumed that features of the previously described embodiment are or at least can be implemented in the further embodiment, unless the following description thereof requires otherwise.

Method 2b

In this method, the dQP' of the luma component, CuQpDeltaVal is coded. Additionally, the difference between the dQp' of each chroma component with the luma dQp' is coded according to the following:

$$CbdQp\text{Delta}Val = CuCbQp\text{Delta}Val - CuQp\text{Delta}Val \quad (11)$$

$$CrdQp\text{Delta}Val = CuCrQp\text{Delta}Val - CuQp\text{Delta}Val \quad (12)$$

Method 2c

In this method, the element CrCbdQpDeltaVal as defined below $$CrCbdQp\text{Delta}Val = CuCrQp\text{Delta}Val - CuCbQp\text{Delta}Val \quad (13)$$

is coded, wherein elements CuCrQpDeltaVal and CuCbQpDeltaVal have the same definition as in the case of Method 2c described above.

Method 2d

In this method, the element CrCbdQpDeltaVal as defined below $$CrCbdQp\text{Delta}Val = CuCrQp\text{Delta}Val - CuCbQp\text{Delta}Val \quad (13)$$

is coded, wherein elements CuCrQpDeltaVal and CuCbQpDeltaVal have the same definition as in the case of Method 2c described above.

Method 2e

In this method, difference values from chroma QP and luma QP, defined as $$dQp'_{Cb} = Qp'_Y - Qp'_{Cb} \quad (14)$$

$$dQp'_{Cr} = Qp'_Y - Qp'_{Cr} \quad (15)$$

are coded. Signaling for Method 2e is similar as Method 2a, without requiring to signal slice_cb_qp_delta and slice_cr_qp_delta (see below) in the slice header.

The following table corresponds to method 2a above, showing an exemplary syntax of raw byte sequence payload (RBSB) for an SPS and Tile Group header, where the syntax elements in accordance with the teachings of the present disclosure are depicted in italics in contrast with other existing syntax elements. This is followed by detailed description of various syntax elements.

| pic_parameter_set_rbsp( ) { | Descriptor |
|---|---|
| pps_pic_parameter_set_id | ue(v) |
| pps_seq_parameter_set_id | ue(v) |
| ...... | |
| init_qp_minus26 | se(v) |
| cu_qp_delta_enabled_flag | u(1) |
| if( cu_qp_delta_enabled_flag ) | |
| cu_qp_delta_subdiv | ue(v) |
| *cu_chroma_qp_delta_enabled_flag* | *u(1)* |
| ...... | |
| } | |

| slice_header( ) { | Descriptor |
|---|---|
| slice_pic_parameter_set_id | ue(v) |
| ...... | |
| slice_qp_delta | se(v) |
| *if(cu_chroma_qp_delta_enabled_flag* ) { | |
| *slice_cb_qp_delta* | *se(v)* |
| *slice_cr_qp_delta* | *se(v)* |
| } | |
| ...... | |
| } | |

| transform_unit( x0, y0, tbWidth, tbHeight, treeType, subTuIndex ) { | Descriptor |
|---|---|
| ...... | |
| if( ( tu_cbf_luma[ x0 ][ y0 ] \| \| tu_cbf_cb[ x0 ][ y0 ] \| \| tu_cbf_cr[ x0 ][ y0 ] ) && treeType != DUAL_TREE_CHROMA ) { | |
| if( cu_qp_delta_enabled_flag && *tu_cbf_luma*[ *x0* ][ *y0* ] && !IsCuQpDeltaCoded ) { | |
| cu_qp_delta_abs | ae(v) |
| if( cu_qp_delta_abs ) | |
| cu_qp_delta_sign_flag | ae(v) |
| } | |
| *if( cu_chroma_qp_delta_enabled_flag && tu_cbf_cb*[ *x0* ][ *y0* ] *&& !IsCuCbQpDeltaCoded* ) { | |
| *cu_cb_qp_delta_abs* | *ae(v)* |
| *if( cu_cb_qp_delta_abs* ) | |
| *cu_cb_qp_delta_sign_flag* | *ae(v)* |
| } | |
| *if( cu_chroma_qp_delta_enabled_flag && tu_cbf_cr*[ *x0* ][ *y0* ] *&& !IsCuCrQpDeltaCoded* ) { | |
| *cu_cr_qp_delta_abs* | *ae(v)* |
| *if( cu_cr_qp_delta_abs* ) | |
| *cu_cr_qp_delta_sign_flag* | *ae(v)* |
| } | |
| } | |
| ...... | |
| } | |

| dual_tree_implicit_qt_split( x0, y0, cbSize, cqtDepth ) { | Descriptor |
|---|---|
| cbSubdiv = 2 * cqtDepth | |
| if( cbSize > 64 ) { | |
| if( cu_qp_delta_enabled_flag && cbSubdiv <= cu_qp_delta_subdiv ) { | |
| IsCuQpDeltaCoded = 0 | |
| CuQpDeltaVal = 0 | |
| CuQgTopLeftX = x0 | |
| CuQgTopLeftY = y0 | |
| } | |
| *if( cu_chroma_qp_delta_enabled_flag && cbSubdiv <= cu_qp_delta_subdiv* ) { | |
| *IsCuCbQpDeltaCoded = 0* | |
| *IsCuCrQpDeltaCoded = 0* | |
| *CuCbQpDeltaVal = 0* | |
| *CuCrQpDeltaVal = 0* | |
| } | |
| ...... | |
| } else { | |
| coding_tree( x0, y0, cbSize, cbSize, 1, cbSubdiv, cqtDepth, 0, 0, 0, DUAL_TREE_LUMA ) | |
| coding_tree( x0, y0, cbSize, cbSize, 0, cbSubdiv, cqtDepth, 0, 0, 0, DUAL_TREE_CHROMA ) | |
| } | |
| } | |

| coding_tree( x0, y0, cbWidth, cbHeight, qgOn, cbSubdiv, cqtDepth, mttDepth, depthOffset, partIdx, treeType ) { | Descriptor |
|---|---|

```
  ......
  if( cu_qp_delta_enabled_flag && qgOn && cbSubdiv <= cu_qp_delta_subdiv )
{
    IsCuQpDeltaCoded = 0
    CuQpDeltaVal = 0
    CuQgTopLeftX = x0
    CuQgTopLeftY = y0
  }
  if( cu_chroma_qp_delta_enabled_flag && qgOn &&
    cbSubdiv <= cu_qp_delta_subdiv ) {
    IsCuCbQpDeltaCoded = 0
    IsCuCrQpDeltaCoded = 0
    CuCbQpDeltaVal = 0
    CuCrQpDeltaVal = 0
  }
  ......
}
```

The methods and systems described in the present disclosure may be implemented in hardware, software, firmware or any combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random-access memory (RAM) and/or a read-only memory (ROM). The instructions may be executed by a processor (e.g., a digital signal processor (DSP), an application specific integrated circuit (ASIC), a field programmable logic array (FPGA), a graphic processing unit (GPU) or a general-purpose GPU).

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. An apparatus to reconstruct coded data, the apparatus comprising:

means for receiving a coded bitstream comprising one or more coded pictures, wherein each picture comprises a luminance component, a first chroma component, and a second chroma component;

means for extracting syntax parameters from the coded bitstream to determine a chroma quantization parameter (QP) table, wherein the chroma QP table maps input luminance QP values to corresponding chroma QP values; and means for decoding the one or more coded pictures based on the chroma QP table, wherein the syntax parameters comprise a start luminance QP value and one or more offset parameters to determine a mapping of the luminance QP values to corresponding chroma QP values using a piece-wise linear representation, wherein for luminance quantization values qP[i] for i larger than an end index value, corresponding chroma quantization values (Qpc[i]) are determined as Qpc[i]=qP[i]-offset, where offset denotes a fixed value.

2. The apparatus of claim 1, wherein the one or more offset parameters comprise a delta QP chroma parameter dQpc[i]=Qpc[i]−Qpc[i−1], wherein i denotes an index and Qpc[i−1] and Qpc[i] denote consecutive chroma QP values.

3. The apparatus of claim 1, wherein the syntax parameters further comprise a flag indicating whether the first chroma component and the second chroma component share a common chroma QP table or whether the first chroma component and the second chroma component have different chroma QP tables.

4. A apparatus to encode a sequence of video pictures to generate a coded video bitstream, the apparatus comprising:

means for receiving a sequence of pictures wherein each picture comprises a luminance component, a first chroma component, and a second chroma component;

means for encoding the sequence of video pictures using luminance quantization parameters (QP) values and chroma QP values to generate a coded video bitstream; and means for encoding signal parameters in the coded video bitstream for a decoder to determine a chroma QP table, wherein the chroma QP table maps input luminance QP values to corresponding chroma QP values, wherein the signal parameters comprise a start luminance QP value and one or more offset parameters to determine a mapping of the luminance QP values to the corresponding chroma QP values using a piece-wise linear representation, wherein for luminance quantization values qP[i] for i larger than an end index value, corresponding chroma quantization values (Qpc[i]) are determined as Qpc[i]=qP[i]-offset, where offset denotes a fixed value.

5. The apparatus of claim 4, wherein the one or more offset parameters comprise a delta QP chroma parameter dQpc[i]=Qpc[i]−Qpc[i−1], wherein i denotes an index and Qpc[i−1] and Qpc[i] denote consecutive chroma QP values.

6. The apparatus of claim 4, wherein the signal parameters further comprise a flag indicating whether the first chroma component and the second chroma component share a common chroma QP table or whether the first chroma component and the second chroma component have different chroma QP tables.

7. A method for transmitting a bitstream which is generated by a video encoding apparatus and used to reconstruct a video, wherein the method comprises:

transmitting the bitstream, wherein generating the bitstream comprises:

receiving a sequence of pictures wherein each picture comprises a luminance component, a first chroma component, and a second chroma component;

encoding the sequence of video pictures using luminance quantization parameters (QP) values and chroma QP values to generate a coded video bitstream; and encoding signal parameters in the coded video bitstream for a decoder to determine a chroma QP table, wherein the chroma QP table maps input luminance QP values to corresponding chroma QP values, wherein the signal parameters comprise a start luminance QP value and one or more offset parameters to determine a mapping of the luminance QP values to the corresponding chroma QP values using a piece-wise linear representation, wherein for luminance quantization values qP[i] for i larger than an end index value, corresponding chroma quantization values (Qpc[i]) are determined as Qpc[i]=qP[i]-offset, where offset denotes a fixed value.

* * * * *